Feb. 12, 1963

J. S. COLLMAN ET AL 3,077,074

REGENERATIVE GAS TURBINE

Filed Sept. 10, 1958

INVENTORS
John S. Collman,
James M. Ricketts, &
William A. Turunen
BY
Paul Fitzpatrick
ATTORNEY

Fig. 6

Feb. 12, 1963  J. S. COLLMAN ET AL  3,077,074
REGENERATIVE GAS TURBINE
Filed Sept. 10, 1958  11 Sheets-Sheet 8

INVENTORS
John S. Collman,
James M. Ricketts &
William A. Turunen
BY
Paul Fitzpatrick
ATTORNEY United States Patent Office 3,077,074
Patented Feb. 12, 1963

3,077,074
REGENERATIVE GAS TURBINE
John S. Collman, Detroit, James M. Ricketts, Oxford, and William A. Turunen, Birmingham, Mich., assignors to General Motors Corporation, Detroit, Mich., a corporation of Delaware
Filed Sept. 10, 1958, Ser. No. 760,211
1 Claim. (Cl. 60—39.31)

Our invention relates to a regenerative gas turbine engine particularly suited for automotive and similar applications. It is an improvement upon or development of an engine of generally similar configuration disclosed in U.S. patent applications Serial Nos. 559,176, 559,389, 559,390 and 559,475, filed January 16, 1956, all of common ownership with this application. The two first-mentioned applications have matured into Patents Nos. 2,960,306 and 2,937,010, respectively, and the last-named application has been abandoned and superseded by a continuation-in-part application Serial No. 127,079 filed July 13, 1961. Application No. 559,390 has matured into Patent No. 3,057,604. The nature and advantages of the invention will be clear to those skilled in the art from the succeeding detailed description of the preferred embodiment thereof and the accompanying drawings.

*General Description*

Figure 1:
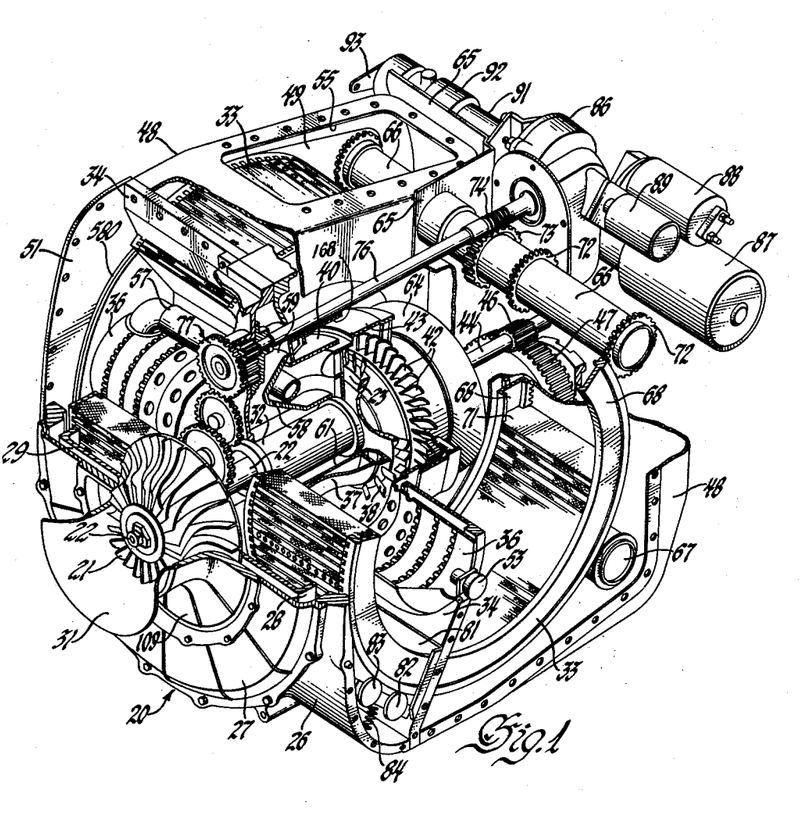
FIG. 1 is an axonometric view of the preferred embodiment of the engine, with parts cut away, and somewhat simplified.
Figure 2:
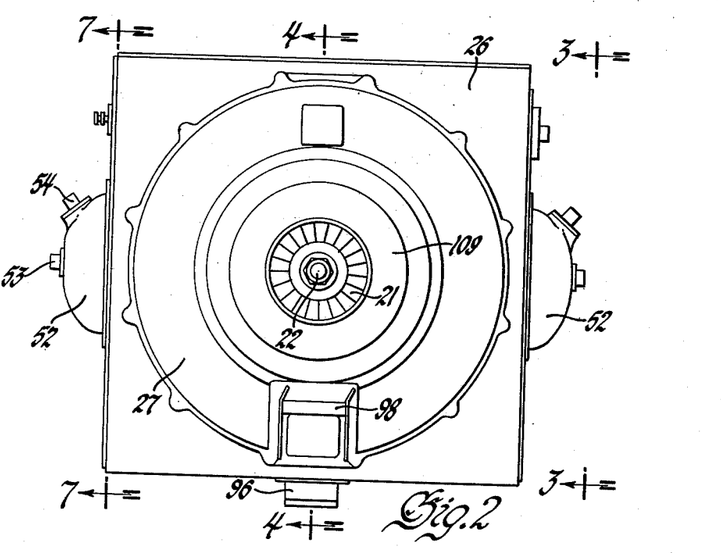
FIG. 2 is a simplified front view of the engine.
Figure 3:
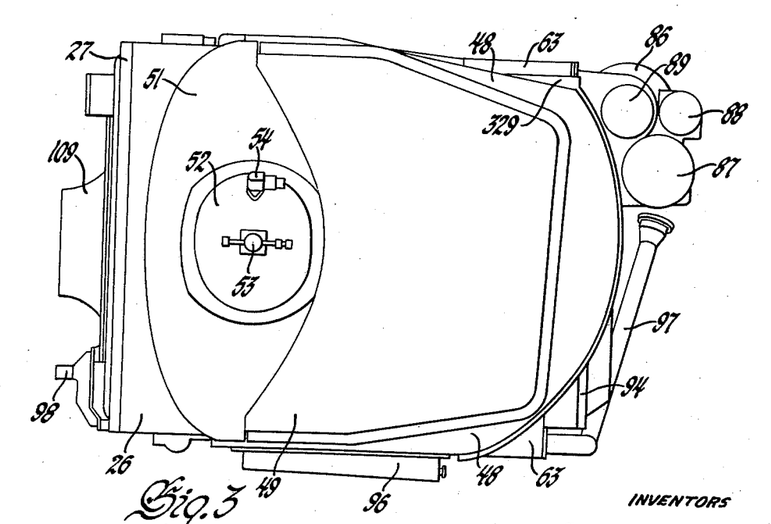
FIG. 3 is a simplified side elevation view of the engine projected on the plane indicated by the line 3—3 in FIG. 2.

By way of introduction to the more detailed description of the engine, its general structure will be outlined briefly with reference to FIGS. 1, 2, and 3. The engine comprises a compressor 20 including a rotor 21 mounted on a shaft 22 on which also is mounted the rotor wheel 23 of a first or compressor turbine. The stator of the compressor comprises the rear case 26 and a front cover assembly 27. A generally annular outlet 28 for the compressor is defined between outer and inner portions of the rear case 26. The compressor diffuser 29 lies between the front cover and the rear case. A suitable air inlet 31 (not shown in FIGS. 2 and 3) may be provided. The compressor rear case is part of a unitary structure which may be termed the forward frame or compressor turbine housing, and which includes a shaft housing 32 within which shaft 22 is supported.

Two regenerator matrix drums 33 are mounted for rotation about a horizontal axis intersecting the axis of shaft 22. Each matrix passes at two points through a bulkhead 34 which comprises an arcuate plate of generally rectangular outline bolted at its upper and lower edges to the compressor rear case portion 26 of the forward frame. Two flame tubes or combustion liners 36 are mounted in the space between the matrix and the bulkhead at the forward side of the bulkhead. These discharge through transition sections 37 into a first or power turbine nozzle 38 mounted in a first turbine case 39. This case 39 is connected to a bulkhead cylinder 40 which defines a circular opening through the bulkhead 34. The second or power turbine, including a rotor wheel 42, is mounted in a second or power turbine case 43 connected to the first turbine case 39. Power turbine wheel 42 is mounted on a shaft 44 which drives the power output shaft of the engine through a pinion 46 and a gear 47. Shafts 22 and 44 extend between the two matrices 33. The portion of each matrix to the rear of the bulkhead is housed in its individual exhaust collector 48.

Each side of the engine is closed by cover plates which provide for access to the matrix and flame tube on that side. A rear cover plate 49 is bolted to the margin of a large opening in the exhaust collector and to the side of the bulkhead. A front cover plate 51 bolted to the sides of the bulkhead and compressor turbine housing and a double-walled combustion chamber cover 52 fixed to the cover plate 51 close to the forward side portion of the engine. A fuel nozzle 53 and an igniter 54 mounted on the combustion chamber cover project into the flame tube 36. Large openings 55 in the upper surface of the exhaust collectors provide for connection of exhaust pipes. The two flame tubes are connected by a cross-over tube 57.

An inner inlet case 58 mounted on the forward frame comprises a front wall 59 which bridges the space between the two matrices ahead of the bulkhead and mounts rim seals for the inner rims of the matrices. The inner inlet case also includes a shaft housing shroud 61 which encloses the shaft housing 32.

The power turbine shaft 44 is supported by a rear frame or power turbine housing 63 which extends from top to bottom of the engine at the rear end thereof. The rear frame includes a power turbine shaft housing, not shown in FIGS. 1 to 3, around which is disposed an inner exhaust case or power turbine shaft housing shroud 64. This shroud is integral with a rear wall, not shown in these figures, which closes the rear part of the engine case between the exhaust collectors 48. Radiation shields 65 are mounted between the exhaust collectors 48 and the rear frame. The rear frame provides a support for a matrix drive shaft 66 and a matrix support shaft 67. These shafts extend parallel to the axis of the matrices. The matrix 33 may be identical or similar to that disclosed in application S.N. 559,389. It includes two rims 68 which are continuous rings and foraminous heat-transfer material 71 extending between the rings. Gears 72 on shaft 66 cooperate with ring gears on the rims 68 to rotate the matrices. Shaft 66 mounts a worm wheel 73 driven by a worm 74 connected to a drive shaft 76 which extends to the forward part of the engine where it is driven by a train of gears 77 from shaft 22 of the compressor turbine.

Shaft 76 is housed in an upper frame rail 168 (not shown in FIG. 1) which is integral with the bulkhead 34 and is bolted to the rear frame 63. A similar rail at the bottom of the engine connects the bulkhead to the lower end of the rear frame. Main seals 81 are provided to seal the matrix at each point where it passes through the bulkhead. Seals 81 are located with respect to the matrix by rollers 82 and 83 engaging the outer rim 68 of the matrix and similar rollers engaging the inner rim. Springs 84 disposed between the main seal assembly and the front case or forward frame 26 bias the rollers into engagement with the rim and aid in the support and location of the matrix.

An accessory drive case 86 bolted to the upper rear part of the rear frame provides a mounting and drive gearing for various accessories driven by the compressor turbine through shaft 76. These accessories may include a starter 87 which has a relay 88, a tachometer 89, a fuel pump 91, and a fuel governor and control 92 regulated by an input or speed setting arm 93. The reduction gearing 46, 47 is housed in a case 94 fixed to the rear frame. Oil pan or sump 96 is fixed to the lower side of the engine and may be filled through a pipe 97. A front support or mounting bracket 98 for the engine is fixed to the compressor cover 27. Rear supports (not shown) may be provided as desired by the structure to which the engine delivers power.

In the light of the foregoing general presentation of the engine, and as an introduction to the detailed description, it may be desirable to point out briefly some of the significant features which distinguish it from the engine disclosed in the applications filed January 16, 1956.

The structural connection of the compressor turbine and power turbine is through a box section frame running from the front cover of the engine across the top, down the rear, and across the bottom of the engine. This is different from the previous engine in which the casing of the engine was a primary structural member. This change of structure has resulted in a very great reduction in weight of the engine.

The compressor turbine is mounted on the forward frame of the engine and the power turbine on the rear frame. The bulkhead forms part of a sub-assembly with the power turbine. The case of the compressor turbine has readily assembled yieldable connections to the bulkhead and to the power turbine case which tolerate relative axial movement and expansion or misalignment of the turbine case portions.

An improved and simplified drive for the regenerator matrices and for accessory devices and the starter coupled to the compressor turbine are provided. A direct mechanical drive is used, and the accessories are moved from the front end of the engine to the rear, which is a preferred location.

The two drive pinions which cooperate with the ring gears on the two rims of each matrix are coupled to a driving shaft by a differential or self-aligning drive arrangement which not only eliminates alignment problems in manufacture, but also delivers equal torque to both rims of the matrix notwithstanding possible distortion from heating and cooling of the matrix.

Matrix rim or bypass seals of two new types are installed. These provide improved sealing and wearing characteristics and facilitate assembly of the engine and of the seals.

Means are provided to lubricate rollers which engage the matrix and serve to locate the primary seal accurately on the matrix.

The succeeding detailed description of the engine will make clear the nature of, and the advantages inherent in, the new engine structure.

*Forward Frame, Compressor, and Accessory Drive Gearing*

Figure 4:
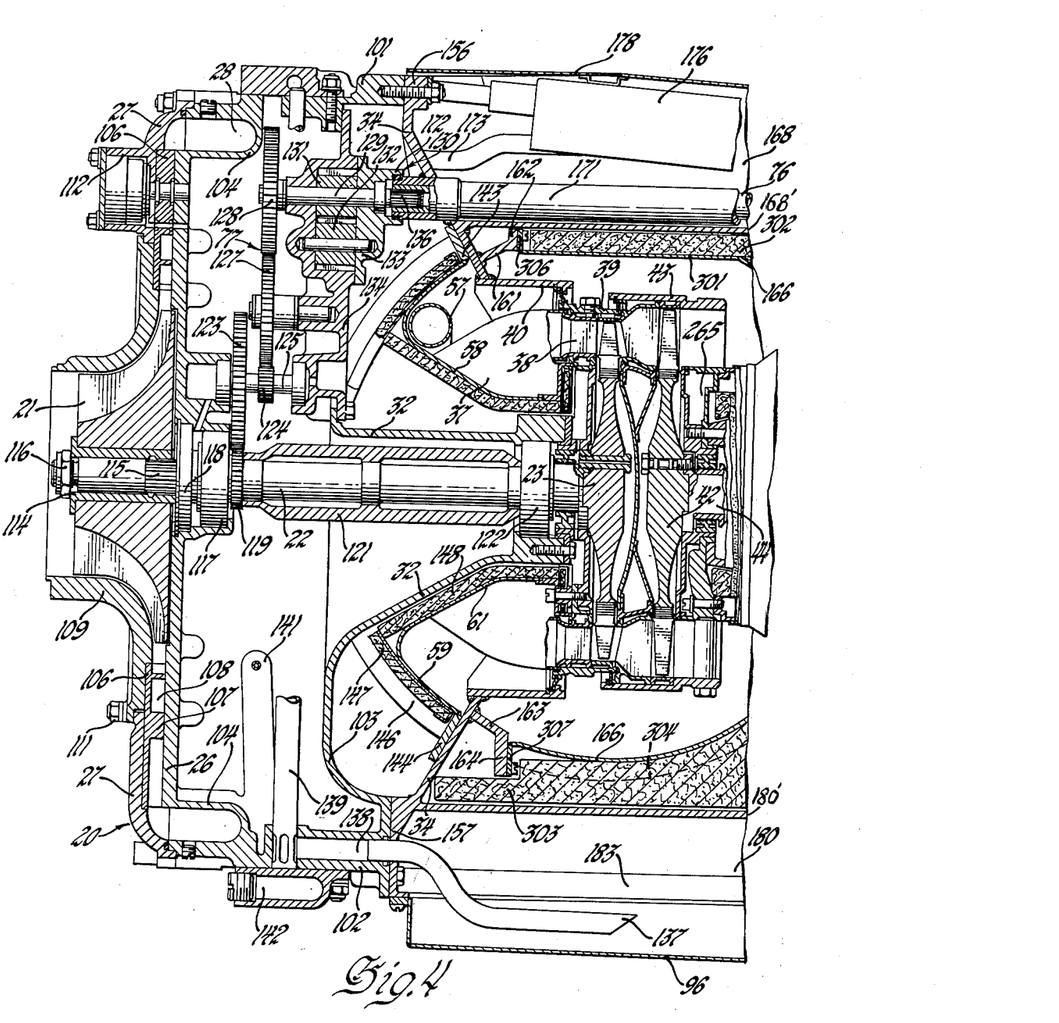
FIGS. 4 and 4a are a sectional view of the engine taken on a vertical plane containing the axis of the engine indicated by the line 4—4 in FIG. 2.

Referring principally to FIG. 4, the forward frame is a unitary casting or weldment comprising a centrally flat dished plate 26 which is the rear case of the compressor. Plate 26 includes an upper flange 101 and a lower flange 102 which are bolted to the upper and lower edges of the bulkhead 34, a box section frame member 103 extending between the upper and lower flanges at the centerline of the engine, and the shaft housing 32 extending from the rear face of the frame portion 103. The generally annular outlet from the compressor is provided by the space 28 between the outer surface of the frame member and an annular diffuser inner boundary 104. This outlet is substantially continuous except that it is interrupted by the frame member 103 and is crossed by struts (not shown). The margins of the circular compressor cover 27 are bolted to the forward frame 26. Suitable diffusing passages for the air discharged from the compressor rotor are provided by a plate 106 having vanes or ridges 107 thereon which define between them diverging passages 108. Annular plate 106 is clamped between the cover 27 and the compressor rear case. The central portion of the compressor cover is a circular plate 109 fixed by bolts 111 to the outer portion of the cover. A mounting boss 112 in the upper portion of cover 27 may provide for mounting of a compressor turbine driven accessory device (not shown).

The compressor rotor 21 is of usual external form and comprises a central sleeve 114 on which the body of the rotor may be shrunk or otherwise fixed and which is internally splined to cooperate with the splined portion 115 of the shaft 22 to which the rotor is fixed by a nut 116. Shaft 22 is supported by a ball bearing 117 mounted in a recess in the compressor rear case portion of the forward frame 26. A suitable shaft seal 118 is provided between the bearing and the rotor. An accessory drive pinion 119 abuts the inner race of bearing 117 and the stiffening and spacing sleeve 121 mounted on shaft 22 abuts the pinion. The roller bearing 122 abutting the sleeve 121 and mounted in a recess in the rear end of the shaft housing 32 supports the rear end of shaft 22.

Pinion 119 drives the accessory drive gearing 77, which comprises a gear 123 and a pinion 124 mounted on a shaft 125. Gear 123 is driven by pinion 119 and pinion 124 drives an idler gear 127 which drives a gear 128 mounted on shaft 129, which is the drive shaft of a lubricating oil pump 130. Pump 130 is of the gear type, comprising a driving gear 131 and a driven gear 132. These gears are mounted in a suitable recess between a pump cover 133 and an accessory gear cover plate 134 bolted over an opening in the rear wall of the upper part of vertical frame member 103. The gears 77 are mounted in suitable bearings and provided with suitable means for lubrication, which need not be shown or described. The rear end of shaft 129 is splined at 136 to couple to the internally splined forward end of drive shaft 76. Oil is supplied to the pump 130 from sump 96 through a suction pipe 137, a passage 138 in flange 102 and a pipe 139, only part of which is shown. Oil is returned from the pump through a pipe 141, partially shown, which discharges into an outlet 142 which may be connected to an external oil cooler. The return connection from the cooler is not illustrated. The means for circulation of oil to the shafting and bearings of the engine is not, in general, illustrated or described, since this may follow conventional practice and is not material to an understanding of the invention.

The forward frame has mounted thereon the turbine inner inlet case 58 which, as previously mentioned, includes a shaft housing shroud 61 disposed around the shaft housing 32 and a front wall portion 59 which is of part cylindrical configuration, extending from a flange 143 at the top to a flange 144 at the bottom; these flanges being bolted to the bulkhead 34. The wall portion 59 closes the opening between the two regenerator matrices, the shaft housing, and the bulkhead to prevent compressor discharge air from passing through the space between the two matrices. Suitable rim seals for the matrices are disposed along the arcuate edges of wall 59, mounted on flanges 146, as will be described subsequently. The inner inlet case mounts insulating material at 147 and 148 to minimize transfer of heat to the shaft 22 from the heated air and by radiation from the flame tubes 36.

The Bulkhead and Frame Rails

The bulkhead and the longitudinal frame rails of the engine are a unitary welded structure which serves two principal purposes. One is to divide the portion of the engine ahead of the turbine from that behind the turbine and thus divide the regenerator between the part traversed by compressed air and the part traversed by turbine exhaust gases. The bulkhead also serves as a principal frame member of the engine, particularly the two frame rails integral therewith which extend rearwardly above and below the engine centerline from the upper and lower margins of the bulkhead.

Referring to FIGS. 4, 4a, 5, and 6, the bulkhead portion 34 of this welded assembly is an arcuate rectangular plate having straight upper and lower edges and curved side edges. Heavy flanges 156 and 157 at the upper and lower edges bolt to the flanges 101 and 102 of the forward frame. Flanges 158 at the sides of bulkhead 34 receive studs 159 which secure the engine cover plates to the bulkhead. The bulkhead cylinder 40 is welded in a circular opening at the center of the bulkhead. This cylinder connects to the turbine case, as will be explained. A stiffening flange 161 extending across the bulkhead plate 34 above cylinder 40 has a bolting flange 162 in the central part thereof between the matrices. A similar stiffening flange 163 extending across the plate 34 below the cylinder has integral with it a bolting flange 164 at the central part thereof between the matrices. These provide for attachment of the rear wall 166, to be described, which closes the gap between the two matrices rearward of the bulkhead.

The upper frame rail 168 is a relatively heavy and rigid channel section welded to the center of the upper edge of the bulkhead and having a web 168'. The upper side of the channel is open. The rear end of rail 168 is partially closed by a plate 169 welded to it. A generally cylindrical housing 171 for the drive shaft 76 extends from end to end of rail 168. At the forward end it pilots into a boss 172 on the gear pump cover plate 133. A tube 173 extending through rail 168 and open at both ends serves to carry turbine cooling air from the forward side of the bulkhead to the rear frame. A short tube 174 extending through the rear plate 169 conducts waste air from the engine to a breather or oil separator 176, which may be packed with suitable gauze or other porous material 177. A light sheet metal plate 178 spaced therefrom to allow escape of air covers the open upper surface of the rail 168.

The lower frame rail 180 is likewise a rigid member of channel section having a web 180' and open at the bottom. It is partially closed at the rear end by plate 181 through which there is a hole 182 for oil draining from the rear frame. A circumferential flange 183 at the lower edge of the rail provides for the cap screws which attach the oil pan 96. Rail 180 provides the upper part of the oil sump.

The Rear Frame

Figure 4A:
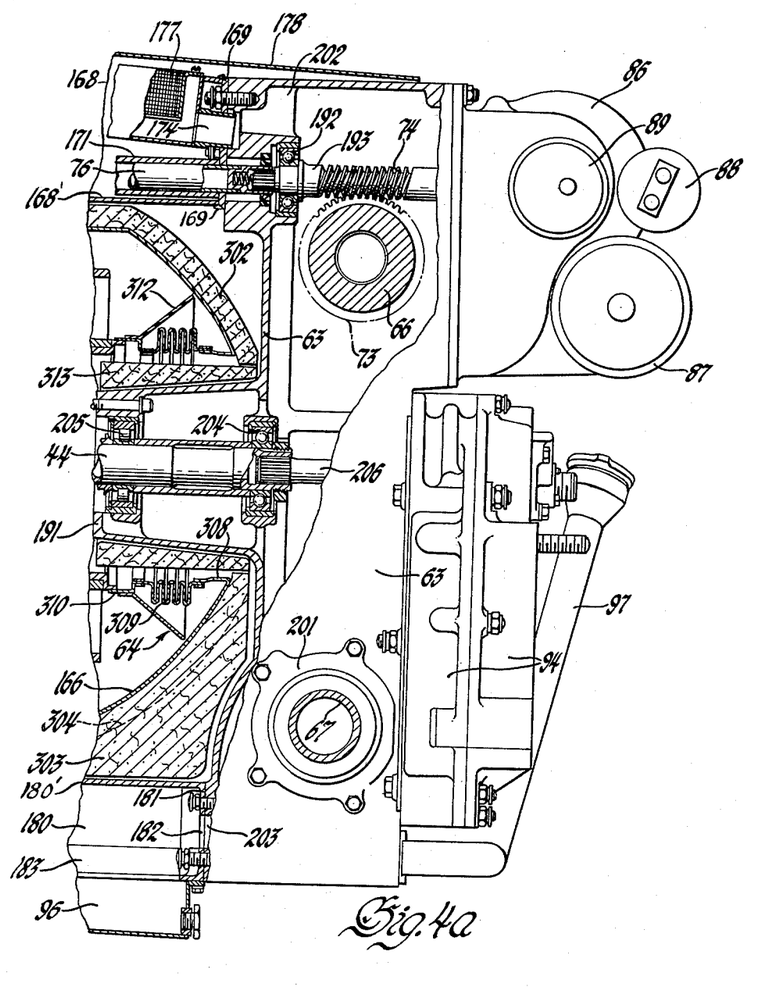
Figure 6:
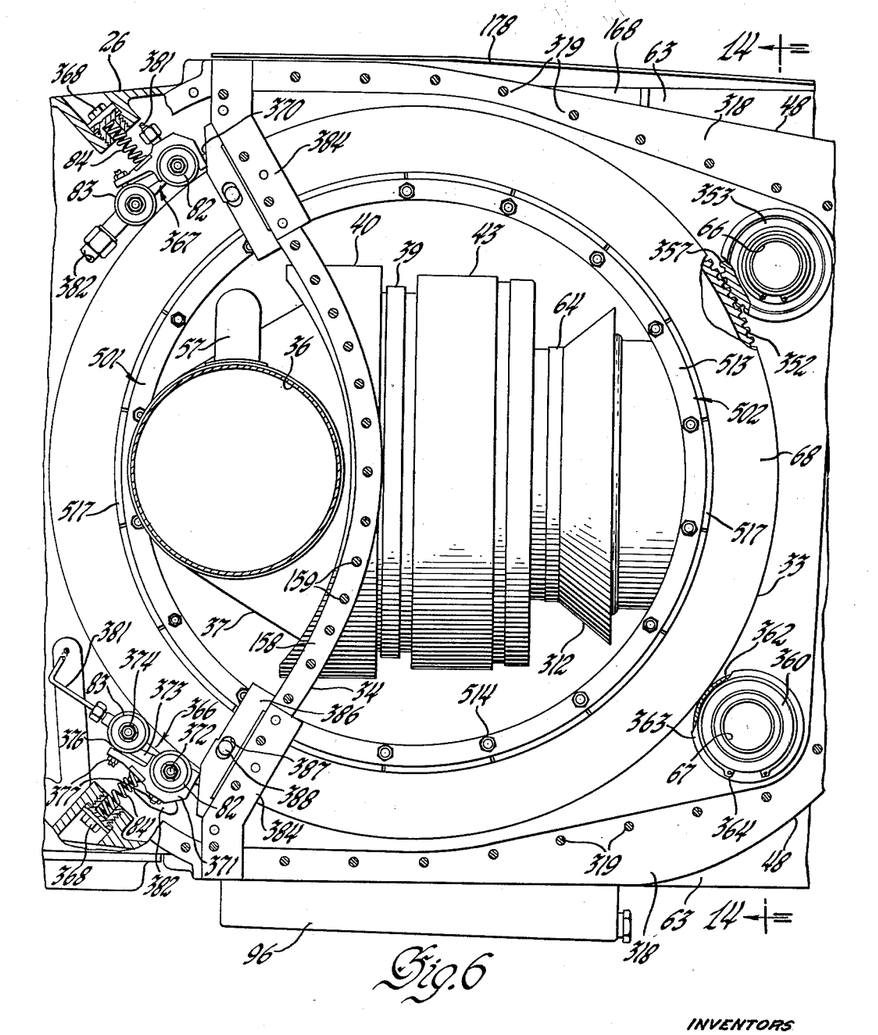
FIG. 6 is a side elevation view of the central portion of the engine with parts cut away and in section.
Figure 14:
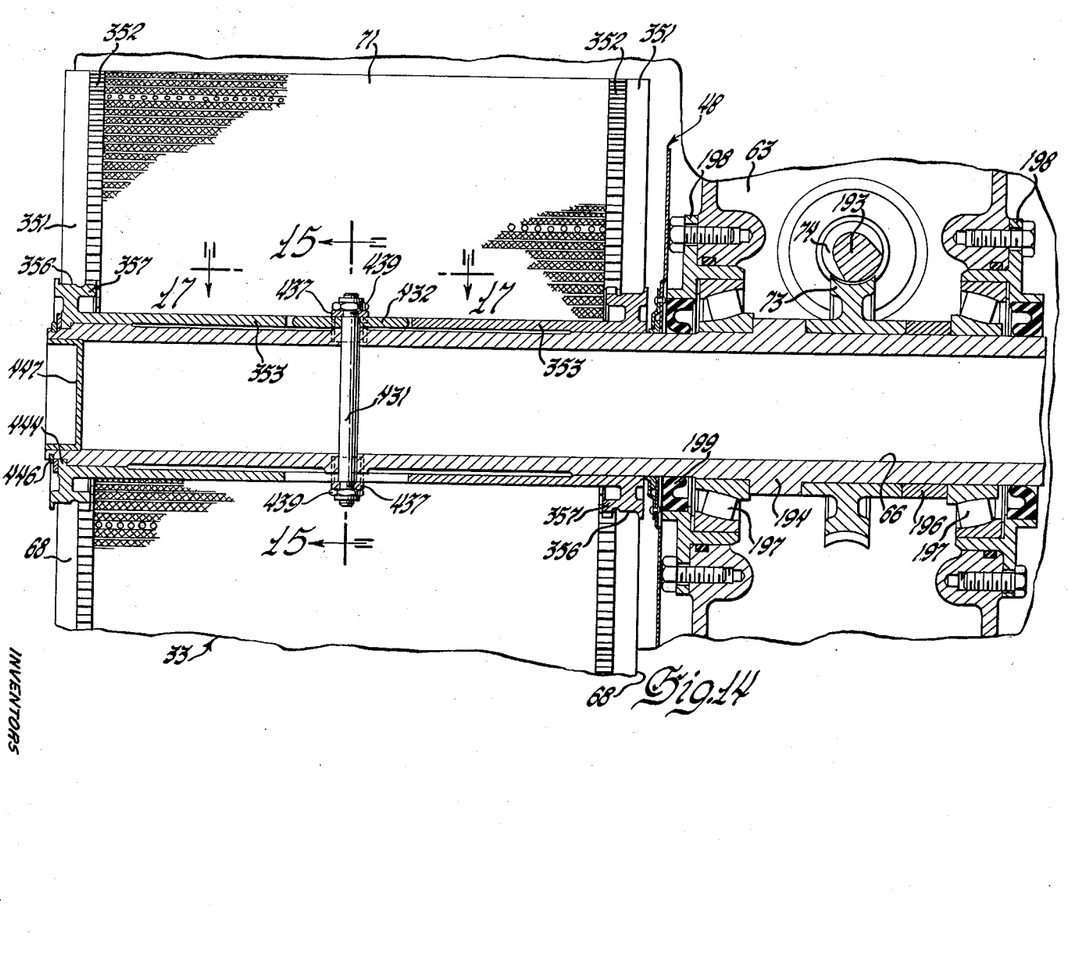
FIG. 14 is a partial transverse sectional view of the engine through the axis of the regenerator drive shaft as indicated by the line 14—14 in FIG. 6.
Figure 15:
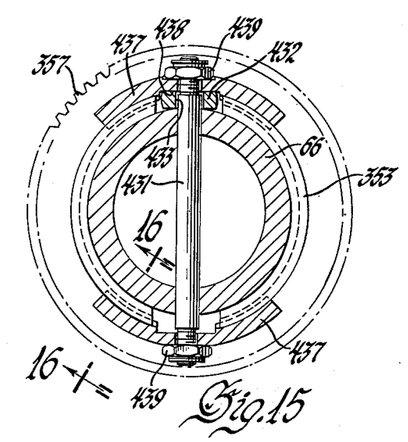
FIG. 15 is a transverse sectional view of the drive shaft taken on the plane indicated by the line 15—15 in FIG. 14.
Figure 16:
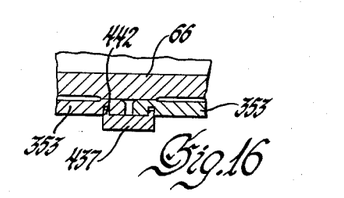
FIG. 16 is a fragmentary sectional view taken on the plane indicated by the line 16—16 in FIG. 15.
Figure 17:
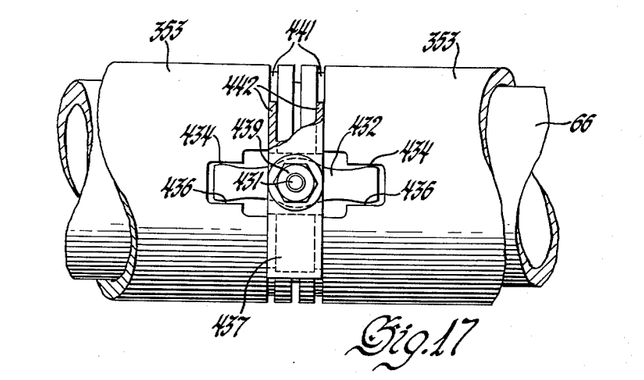
FIG. 17 is a plan view of the matrix drive shaft taken on the plane indicated by the line 17—17 in FIG. 14.

The rear frame or power turbine housing, as shown principally in FIGURES 4a, 6 and 14, is a strong, rigid vertical box section member attached to the rear ends of the upper and lower frame rails. It includes a power turbine shaft housing 191 extending forwardly from the center of the frame which supports the power turbine shaft 44 and power turbine case 43. The rear frame mounts a ball bearing 192 which supports the forward end of shaft 193 in which the regenerator drive worm 74 is cut. Shaft 193 is coupled to the drive shaft 76 which extends through the upper frame rail. The shaft 193 is also supported by a bearing (not shown) in the accessory drive case 86 which bolts to the rear face of frame 63. The case 86 contains suitable gearing (not illustrated) by which the accessories are coupled to shaft 193 and thus to the compressor turbine.

Referring to FIG. 14 for the support of the matrix drive shaft 66, worm wheel 73, which may be suitably keyed to shaft 66, abuts a shoulder 194 on the shaft and a spacer ring 196. The inner races of roller bearings 197 engage shoulder 194 and spacer 196 respectively. The outer races of bearings 197 are retained in cages 198 secured to the rear frame by cap screws. Suitable oil seals 199 are mounted in the bearing cages. Bearings 197 provide the sole support for shaft 66, which has no outboard bearing. The structure of the shaft and its connection to the matrices will be described later. Matrix support shaft 67, which is an idler shaft, is mounted in the rear frame similarly to the shaft 66, the bearings and seals for this shaft being retained by cages 201 (FIGURE 4a).

Opening 202 in the upper end of the frame vents oil-laden air to the breather 176 and the hole 203 in the lower end of the frame allows lubricating oil to return to the sump 96.

A ball bearing 204 and a roller bearing 205 for the power turbine shaft 44 are mounted in webs in the shaft housing portion 191 of the rear frame. These bearings are mounted in the housing and on the shaft by conventional structure. The rear end of shaft 44 is internally splined to receive an externally splined power take-off shaft 206 which extends into the reduction gear 94 and mounts pinion 46 (FIGURE 1) which drives gear 47 on the power output shaft of the engine. Gears 46 and 47 are housed in a reduction gear case 94 bolted to the rear face of the rear frame. The details of the reduction gearing are immaterial to the invention. The rear support or mount for the engine may be provided by a transmission (not shown) which may be fixed to the rear end of the reduction case 94.

The Turbine

Figure 5:
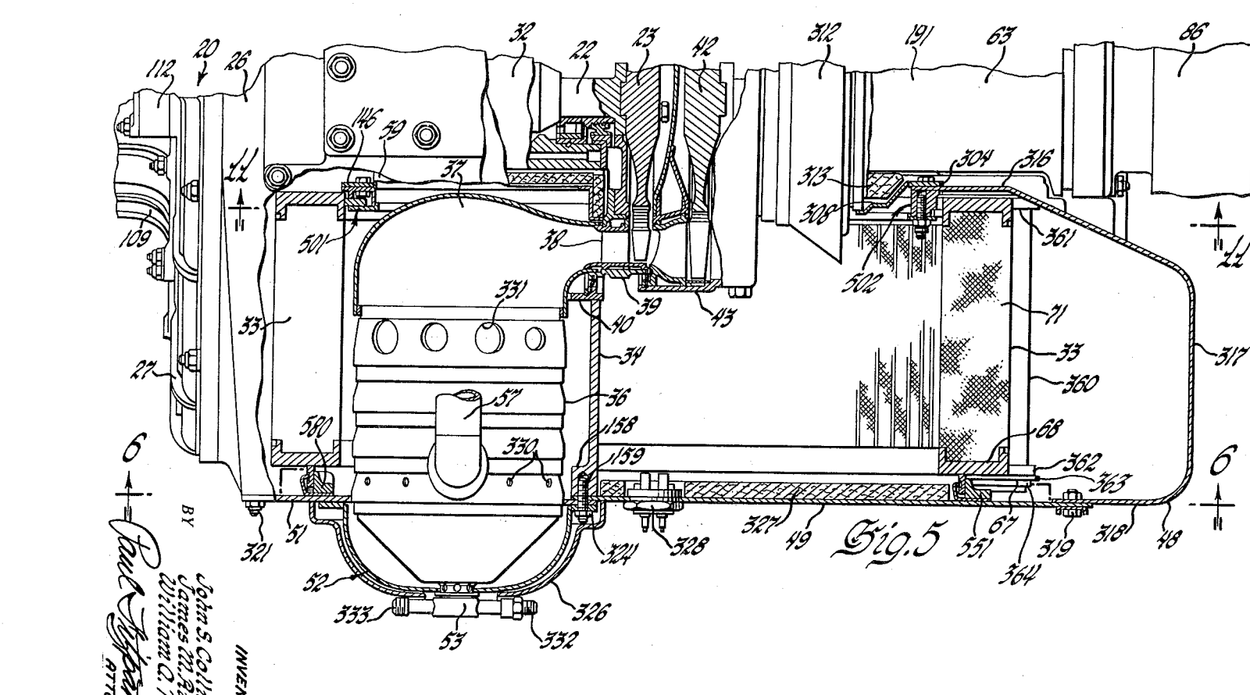
FIG. 5 is a plan view, with parts cut away and in section.
Figure 5A:
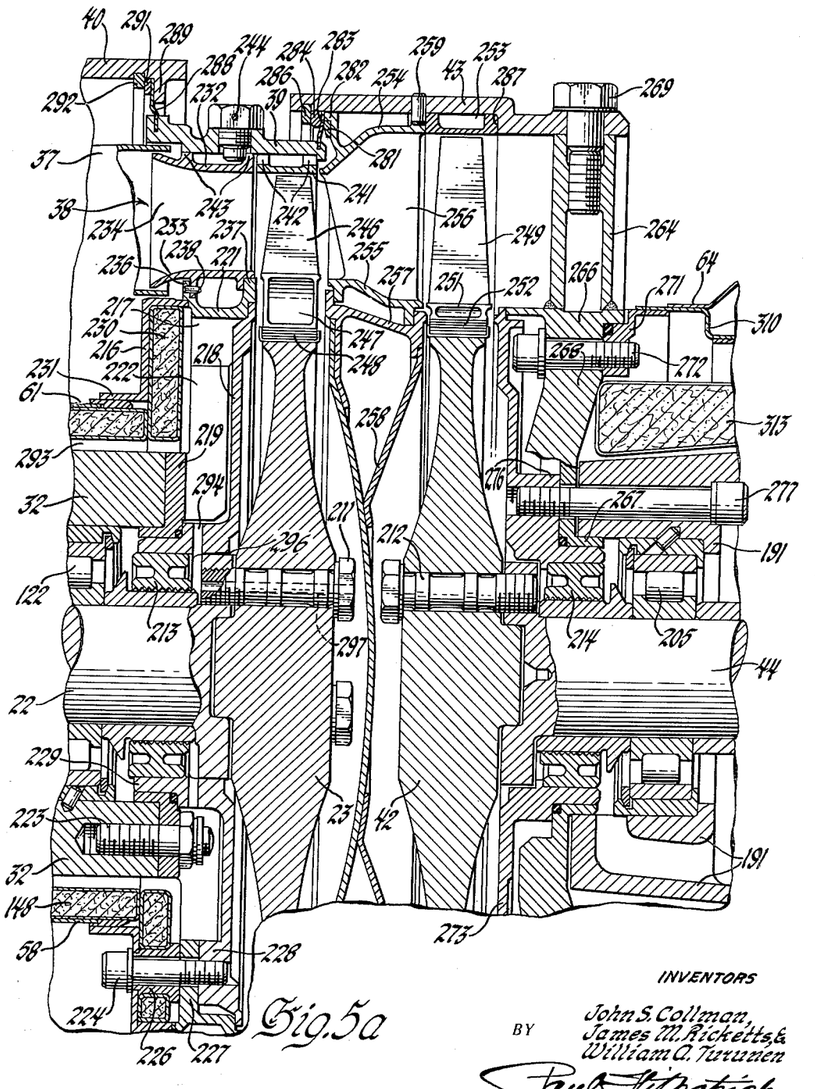
FIG. 5a is a fragmentary enlarged view taken on the same plane as FIG. 4.

The turbine is shown in FIGURES 4 to 6, especially FIG. 5a. It is a two-stage gas-coupled turbine comprising a first or compressor turbine, which is the high pressure stage, and a second or power turbine, which is the low pressure stage. The stator and rotor of the compressor turbine are supported by the shaft housing portion of the forward frame and the stator and rotor of the power turbine are supported by the shaft housing portion of the rear frame. These frames are joined together by the upper and lower frame rails. The turbine case is in sections which are connected together by yieldable means to tolerate the effects of relative thermal expansion and also of any normal distortion of the engine in service.

The bulkhead cylinder 40, which is integral with the bulkhead 34, may be considered to be the inlet case of the turbine. The outlet or transition portions 37 of the flame tubes extend into the cylinder 40. The first turbine is housed in the annular case 39 and the second turbine in the annular case 43. The rear end of the first turbine shaft 22, which is supported in roller bearing 122, has a flange against which the first turbine wheel 23 abuts and into which it is piloted. The wheel is secured to the shaft by three bolts 211. The second turbine wheel 42 is similarly mounted on the shaft 44 by three bolts 212. Labyrinth-type oil seals 213 and 214 are provided between the turbine wheels and the bearings 122 and 205.

The portion of the stator of the first turbine lying internally of the turbine nozzle 38 comprises a front ring 216, an annular nozzle support 217, and a diaphragm or heat barrier ring 218. The nozzle support 217 includes a hub portion 219 joined to a rim portion 221 by spokes or radial arms 222. The hub portion pilots into the rear end of the shaft support 32 and is fixed to it by studs and nuts 223. The front ring 216 and heat shield 218 are fixed to the nozzle support 217 by cap screws 224 which pass through ring 216, spacing sleeves 226, and inwardly directed tabs 227 on the nozzle support ring, and are threaded into bosses 228 on the heat shield 218. The heat shield includes a forwardly projecting flange 229 which pilots into the nozzle support and which supports the seal member 213. Insulating material 230 is mounted on the rear surface of ring 216. The front ring 216 has a forwardly projecting flange 231 which fits over the rear end of the shaft housing shroud 58 to locate and support the shroud. This is an axially slidable connection.

The first turbine nozzle 38 comprises four segments of 90° extent, each including an outer shroud 232, an inner shroud 233, and vanes 234 extending between the shrouds. Each segment may be an integrally cast part. Two flanges extending from the inner shroud 233 fit between flanges 236 and 237 at the front and rear edges of the nozzle support 217. The interfitting flanges locate the nozzle segments axially of the engine. Pins 238 pressed into the flange 236 and engaging in notches in the front flange of the inner shroud locate the segments against movement around the turbine axis.

Stationary shroud 241 for the first turbine wheel is mounted in the first turbine case 39. Shroud 241 has interrupted flanges 242 engaging the inner surface of the case to minimize heat transfer. Shroud 241 engages an inwardly directed flange at the rear end of case 39. When the shroud 241 has been put in the case and the nozzle segments have been fitted onto the support, the case may be slid over the nozzle segments to retain them on the support. The outer shroud 232 is spaced from the case by flanges 243 and the outer case is located circumferentially and axially with respect to the nozzle segments by screws 244 engaging shoulders on the outer shroud. The nozzle 38 directs the combustion gases to blades 246 connected by stalks 247 and fir tree dovetail roots 248 to the wheel 23.

The structure of the second or power turbine is similar to that of the first turbine. The longer blades 249 of the second turbine are connected by short stalks 251 and dovetail roots 252 to wheel 42. This wheel is surrounded by a stationary shroud 253 which abuts a shoulder 254 on the interior of the second turbine case 43. The second turbine nozzle comprises four segments each embodying an outer shroud 254, an inner shroud 255, and vanes 256 extending between the shrouds. Two inwardly directed flanges on the inner shroud lie between flanges at the edges of a ring 257 forming the periphery of an interstage diaphragm 258. The diaphragm is of sheet metal welded to the ring 257. The shroud segments 254 are held against rotation with respect to case 43 by pins 259 pressed into the case and engaging in notches in a flange at the rear edge of shroud 254.

The rear turbine case 43 is supported by six tubular struts 264 which extend from a rear turbine support ring 266. This ring includes an inner flange 267 which pilots into the rear turbine support 191. An annular web 265 including six ribs 268 extends from the flange 267 to the rim portion of ring 266. Struts 264 are welded to the ring 266 over the ribs and are tapped for cap screws 269 which secure the case 43 to the struts. The shaft housing shroud 64 includes inwardly directed flanges or tabs 271 which are fixed to the support 266 by cap screws 272.

An annular heat shield or diaphragm 273, which has a rearwardly directed flange mounting the labyrinth seal member 214 and piloting into flange 267 of the rear turbine support, extends outwardly and abuts the forward outer edge of the support ring 266. Bosses 276 on the shield 273 between the ribs 268 are tapped for cap screws 277 which extend through the shaft support 191 and the web of support ring 266, and are threaded into the bosses 276.

It may be noted at this point that in the assembly of the engine the second turbine, rear frame, and bulkhead constitute one sub-assembly of the engine. The forward frame and first turbine constitute another sub-assembly of the engine. To complete the assembly of the turbine, these sub-assemblies are connected together. The means by which these are connected includes the yieldable connections previously mentioned. A chamfered ring 281 is disposed against the forward and inner face of the front flange 282 of the rear turbine nozzle segments. A yieldable sealing ring 283 of thin sheet metal is disposed around the rear end of the front turbine case 39, engaging in a narrow slot or saw cut in the periphery of the case. When the turbine is assembled, ring 283 bears against ring 281 and against a spacer ring 284 disposed around the rear end of the front turbine case which fits immediately inside the inner surface of the rear turbine case 43. An expanding lock ring 286 is lodged in an internal groove in the rear turbine case when the assembly is completed. The outer margin of the yieldable sealing ring 286 is thus held between rings 281 and 284. These parts, as well as the shroud 253 and nozzle shroud segments 254, are held in the rear turbine case against a shoulder 287 by the expanding lock ring 286. The sheet metal ring 283 can yield to allow relative axial movement of the cases 39 and 43, and also has some radial clearance so that it will tolerate some radial misalignment or relative expansion of the two cases.

The front turbine case 39 is similarly connected to the bulkhead cylinder 40 upon assembly of the engine. A second yieldable ring 288 of yieldable thin metal is lodged in a narrow circumferential saw cut in the front edge of case 39 and is retained against a flange 289 on the interior of the bulkhead cylinder by a spacer ring 291 and an expanding lock ring 292 lodged in an internal groove in the bulkhead cylinder. This structure, because of flexibility of the ring 288 and radial clearances at the inner and outer edges of the ring, allows for relative axial and radial movement of the case 39 with respect to the bulkhead cylinder. As previously pointed out, the turbine case 39 is primarily supported by the first turbine shaft support 32 through the support ring 217 and nozzle 38; thus, the front turbine case will be maintained concentric with the turbine wheel likewise supported in member 32. It need not be exactly concentric with the cylinder 40 or rear case 43.

Means are provided for supplying air to the first turbine wheel 23 to cool the wheel and to pressurize the labyrinth seal 213 against escape of oil into the turbine. This air flows from the compressor discharge ahead of the regenerators through a space 293 between the shaft housing 32 and shaft housing shroud 61 and into the space ahead of the heat shield 218 and behind the central portion 219 of the first turbine nozzle support. It is metered through radial passages 294 in the flange 229 of ring 218 into the space between labyrinth seal 213 and the flange at the end of shaft 22. Some of this air flows through a small clearance at 296 between the hub of the shaft and ring 218 and over the forward face of turbine wheel 23 to cool the turbine wheel. The remainder of the air flows through drilled passages 297 in the wheel mounting bolts 211 to the rear face of the wheel whence it flows outwardly between the wheel and diaphragm 258. The cooling air discharges into the motive fluid path through the gaps between blades 246 and shrouds 253 and 254. Air may also be taken from the compressor and supplied to the rear face of the second turbine wheel and through bolts 212. Since this structure is similar to that just described, it need not be illustrated or further described.

*The Inner Exhaust Case*

The inner exhaust case has been referred to previously. It is a unitary welded structure comprising two principal 368 threaded into tapped openings in bosses in the forward frame portion 26. As will be apparent, the springs and plugs may be inserted from outside the engine after the matrix has been installed in the engine. The carriages 366 and 367 serve to support the matrix, but their principal function is to support and locate the primary seals which seal against gas leakage where each matrix passes through the bulkhead. The primary seals 370 are floatingly mounted with respect to the bulkhead 34 and have secondary seals (not shown) between the primary seals and the bulkhead. The primary and secondary seals constitute a main seal 81 (FIGURE 1). Exact alignment of the primary seals with the matrix is attained by mounting them on the carriages 366 and 367 which track on the matrix.

The structure of the main seals is not described herein in the interest of conciseness, since the details are not material to this invention. The structure may be as described in application Serial No. 559,390 previously referred to (Patent No. 3,057,604), or application No. 595,979 filed July 5, 1956 (Patent No. 2,888,248), of common ownership with this application. Primary seals 370 are indicated in outline in FIGURES 7 and 11, and a portion which bolts to the carriage 366 or 367 is shown in FIGURE 6.

The carriages 366 and 367 are different structurally from the supporting and locating means for the primary seal described in the prior applications. Each carriage includes a body 371 to which primary seal 370 is bolted and which is biased inwardly by a spring 84 at each end of the body. Rollers 82 and 83, which bear against the rims of the matrix, are mounted on shafts 372 and 374, respectively, mounted in shaft housings (not illustrated) rigidly connected by hollow arms 373. The housing for shaft 372 fits between locating abutments on body 371. Set screws 376 and nuts 377 are adjustable to vary the setting of shafts 372 and 374 radially of the matrix with respect to body 371 to align the primary seal exactly with the matrix.

Means are provided for lubricating the bearings for rollers 82 and 83. A flexible pipe 381 extending from the forward frame is connected to a housing for shaft 374 and the oil after lubricating shaft 374 may drain through arms 373 to lubricate bearings for shaft 372. The used oil drains through a flexible line 382 into a fitting which returns it to the forward frame.

The matrices pass through slots in the bulkhead which are open at the outer ends to permit installation of the matrix and main seals and are closed by plates 384 after the matrix with the main seals (primary and secondary seal assemblies) on it has been installed in the bulkhead. Plates 384 are fixed to the bulkhead and also are fixed to the cover plates 49 and 51 which bolt over them. The forward portion 386 of each plate 384 is depressed below the outer surface of the main body of plate 384 so that it is spaced from the cover plate 51. A radial slot 387 in this portion of plate 384 receives a trunnion 388 extending from the body of the primary seal. The trunnion locates the seal and holds it against movement circumferentially of the matrix. Because of the radial extent of the slot, the primary seal may move radially inward and outward as the radius of the matrix changes with respect to the fixed structure because of thermal expansion. This movement is accommodated by the springs 84 and the rollers 82, 83 engaging the track on the matrix which maintain proper alignment of the primary seals with the matrix.

It will be noted that the carriages 366 and 367 are located in the space ahead of the matrix which receives compressor discharge air. While there is considerable heat radiated by the hot matrix, the air at this point which circulates around the carriages is relatively cool. It will be seen that this structure provides for cooling of the primary seal supporting structure. The means for lubricating the carriage structure contributes greatly to the life of the parts and is a desirable improvement, even though the matrix rotates slowly, ordinarily some 30 to 40 revolutions per minute.

We may now consider, with reference to FIGS. 14 through 17, a differential drive to the matrix driving pinions 357 from matrix drive shaft 66. As previously stated, the pinions 357 are mounted on sleeves 353 which are a slip fit on shaft 66 and may rotate slightly with respect to the shaft. The shaft drives these sleeves through a differential mechanism which allows either sleeve to move ahead slightly with respect to the other and provides an even distribution of load between the pinions 357 and proper tooth contact between the pinions and the gears 352 on the matrix. This not only compensates for and eliminates problems in alignment of the pinions in installation but it also compensates for any warping of the matrix which might move one gear 352 slightly out of step with the other. With the construction according to this invention, it is not necessary to attempt to align exactly the teeth of the two ring gears 352 or align the teeth of the pinions 357. The structure is self-aligning.

A pivot or pivot pin 431 extends diametrically through the shaft between the ends of the sleeves and projects from the shaft, each end of the pivot being threaded. A rocker arm 432 is pivoted on the pin 431 by a hole 433 through the center of the rocker arm. The rocker arm has enlarged rounded ends 434 which extend into slots 436 cut through the adjacent ends of the sleeves 353. An arcuate retainer 474 lies over the rocker arm 432 and has a flat recess 438 in its inner surface against which the upper surface of rocker arm 432 may bear. A second retainer 437 is mounted over the other end of pivot 431 and the two retainers are held in place by nuts 439. The retainer serves not only to retain the rocker arm 432 but also to maintain the sleeves in position. Circumferential grooves 441 adjacent the ends of the sleeves receive inwardly directed flanges 442 on each of the retainers 437.

As will be apparent, when the shaft 66 is rotated and pinions 57 engage the gears on the matrix, if either gear set is out of driving contact the rocker arm 432 may rock slightly about its pivot 431. Since the two arms of the rocker arm are equal, equal torque will be transmitted to each sleeve, subject to any slight difference due to friction between the sleeves and the shaft 66.

Referring to FIGURE 14, the outer sleeve 353 has a flange 444 which abuts a shoulder on the outer end of shaft 66 and is retained by snap ring 446. This structure is a relic of a former construction, and is not necessary with the retainer installation 437. The outer ends of shaft 66 are closed by pressed-in plugs 447.

*The Inner Rim Seals*

Figures 11, 12, 13:
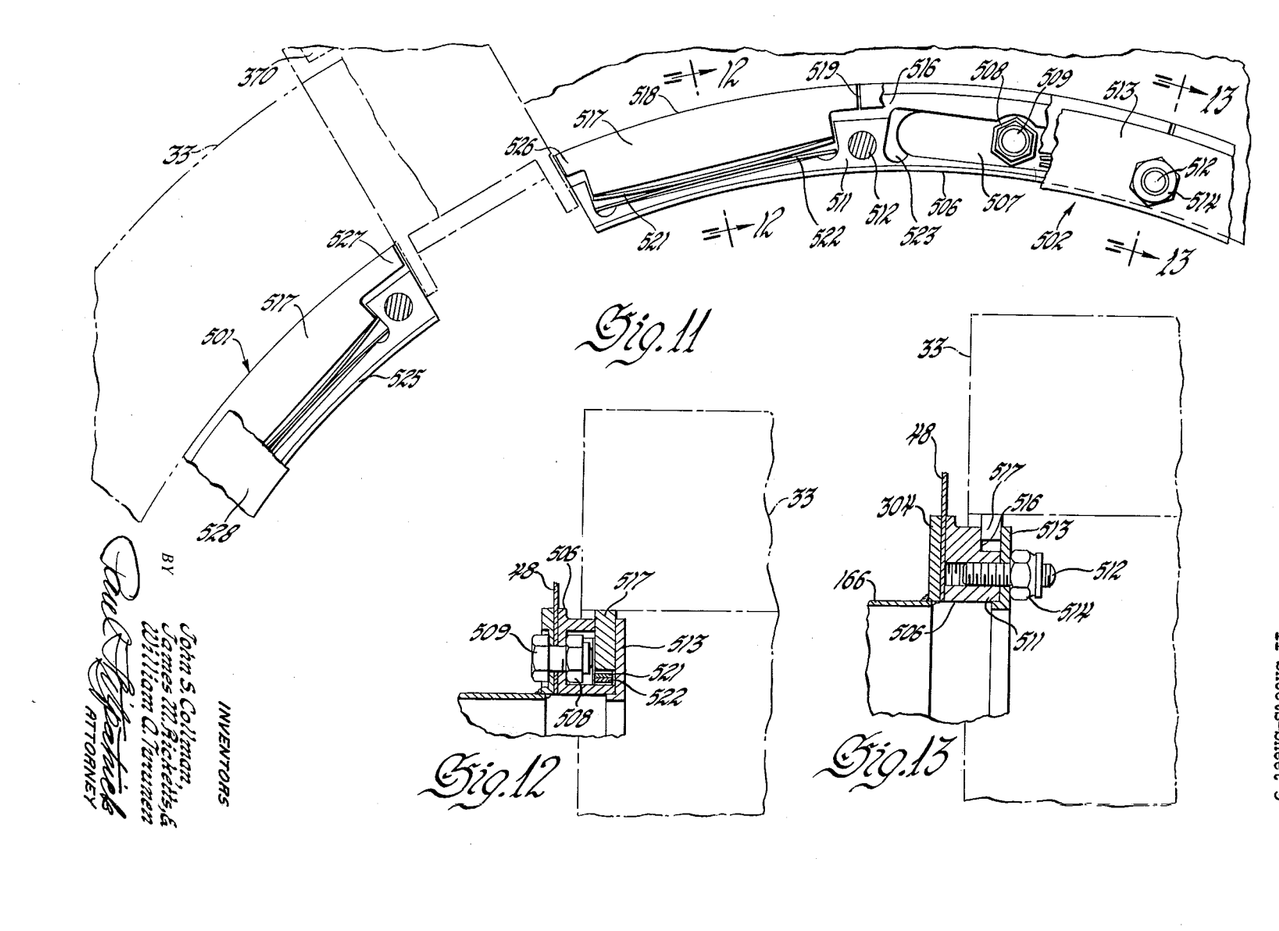
FIG. 11 is an elevation view of the inner rim seals of the regenerator.
FIG. 12 is a transverse section of the same taken on the plane indicated by the line 12—12 in FIG. 11.
FIG. 13 is a transverse sectional view of the same taken on the line indicated by the line 13—13 in FIG. 11.

The inner rim or bypass seals which seal against the inner rims of the matrices are shown generally in FIGURE 6, and in detail in FIGURES 11, 12 and 13. The seals provide a ring of seals engaging the radially inner surface of the matrix inner rim 68. This ring of seals is broken in the two places where the primary seals 370 surround the matrix. There is thus a front inner rim seal 501 and a rear inner rim seal 502 (FIGURE 6). Referring to FIGURE 11, the matrix 33 is indicated by broken lines and also the location of the primary seal 370 by the broken outline.

The front inner rim seal 501 is mounted on the flange of the front wall 59 and the rear seal is mounted on the flange 304 of the rear wall 166. Referring first to the rear seal, the mounting structure for the seal comprises an arcuate support 506 in which are machined circumferentially extending recesses 507 which receive sheet metal nuts 508 threaded onto bolts 509 which fix the support 506 to the flange 304. The inner flange 316 of the exhaust collector 48 is drilled for the bolts 509 so that the support 506 and nuts 508 also serve to mount the exhaust collector to the rear wall. Bosses 511 extending to the outer surface of the support 506 are tapped for studs 512 sections having different functions. The rear wall portion 166, shown principally in FIGS. 4 and 4a, is basically a flat band, extending through approximately two-thirds of a circular arc, which bridges the space between the two matrices rearwardly of the diaphragm. The upper portion 301 of the wall is flattened to provide clearance from the lower surface of the upper frame rail 168. An insulating pad or blanket 302 is disposed over the upper part of wall 166. A similar and heavier insulating pad 303 is disposed below the lower portion of wall 166 and extends upwardly adjacent the shaft housing to protect the rear frame and oil sump from heat. The rear wall 166 has a radially extending flange 304 at each side thereof, which locates the insulating material and serves as a bolting or mounting flange for matrix rim seals and the exhaust collectors, as will be described. Transverse flanges 306 and 307 at the upper and lower ends of wall 166 provide for bolting it to flanges on the bulkhead previously described. The rear wall 166 is interrupted at the location of the rear turbine shaft housing 191, which projects through the wall. The flanges 304 continue past this opening, as illustrated in FIGURE 5.

The shaft housing shroud 64 comprises a short tubular member 308, a bellows 309, and a front tubular section 310, all welded together. The lugs 271 which connect the forward end of the shroud to the rear turbine support 266 are fixed to portion 310. The bellows provides for relative expansion of the parts while maintaining an airtight connection. A conical exhaust deflector or inner cone 312 is fixed to the outer surface of the shroud. This serves to direct the turbine exhaust gases more uniformly toward the regenerator matrices. A generally cylindrical insulating blanket 313 is disposed around the shaft support 191 between it and the shroud 64.

*Exhaust Collectors, Cover Plates, and Radiation Shields*

Referring to FIGURES 1, 2, 3, 5 and 6 we may consider the sheet metal which encloses the engine or more particularly the regenerator part of the engine, which has already been described briefly in connection with FIGURES 1 to 3.

The exhaust collectors 48 are sheet metal casings which principally define an exhaust space outwardly and to the rear of the regenerator matrix. Each exhaust collector 48 has an inner arcuate flange 316 which bolts to the flange 304 of the rear wall. A wall 317 extends toward the outside of the engine from the flange or inner portion 316 and an inwardly directed flange 318 is disposed at the outer edge of the exhaust casing. The upper and lower edges of the exhaust collector at the front have flanges which are bolted to the outer part of the upper and lower edges of the bulkhead 34. Bolts 319 (FIGURE 6) thread into nuts welded to the inside of flange 316 mount the large rear cover plate 49. The front edge of this cover plate overlies the outer side surfaces of the bulkhead 34. The front cover plate 51 has its rear margin disposed over the edge of the bulkhead and the front edge of rear cover plate 49. The front edge of the front cover plate overlies the rear margin of the front case 26, to which it is fixed by nuts 321 on studs extending from the front case.

The combustion chamber cover 52 referred to previously is a domed flanged sheet metal structure (FIGURES 2, 3 and 5). It is mounted by nuts on studs (not shown) extending from the front cover 51 and by nuts 324 on studs 159 which extend through the cover plates 49 and 51 where the cover 52 overlies the bulkhead.

An outer cover or radiation shield 326 overlying and spaced from cover 52 (not shown in FIGURES 2 and 3) is retained on the front cover 51 by bolts, not illustrated.

A heat insulating blanket 327 and a thermocouple connector 328 are shown mounted on the wall of rear cover 49. Heat shields 65 (FIGURE 1) extend vertically between the exhaust collectors 48 and the rear frame 63. The engine exhausts from the exhaust collectors through openings 55 (FIGURE 1) in the upper surface of the collectors. Suitable exhaust pipes (not shown) may be bolted over these openings.

*Combustion Apparatus*

The combustion apparatus (FIGURE 5) includes the two flame tubes 36 at each side of the engine. These are of known type, composed of a number of rings welded together so as to provide openings for film cooling air. Primary combustion air holes 330 and dilution air holes 331 are also provided in the liner. Each liner discharges into the transition section 37 which terminates in a half annular outlet which fits over the first turbine nozzle. The structure of the fuel nozzle 53 which is mounted in the cover 52 and projects into the dome or inlet end of the flame tube 36 is immaterial to the invention. It is preferably an air atomizing type nozzle having a fuel inlet 332 and an air inlet 333. Each flame tube is provided with an igniter 54, FIGURES 2 and 3, mounted on the cover 52 and projecting into the chamber. The structure of the igniter is immaterial. To insure satisfactory ignition of both combustion chambers in the event of a failure of one igniter, the two chambers are connected by a crossover tube 57 extending from one flame tube to the other.

*Regenerator Matrix Structure, Drive and Support*

The structure of the regenerator matrix and the means by which it is supported and driven are shown principally in FIGURES 1, 5, 6 and 14. The structure of the matrix except insofar as it is adapted to cooperate with the other structures of the engine is immaterial to the present invention. The matrix may be identical to that described in application Serial No. 559,389, previously referred to. For the purpose of understanding the engine generally, the matrix is of drum configuration comprising outer and inner channel-section rings 68 defining the rims of the matrix, between which is fixed a ring of foraminous heat exchange material 71, the assembly making up a rigid regenerator drum 33. Each ring 68 has on its outer periphery a cylindrical track section 351 and a ring gear 352. The present matrix preferably differs from that previously described in that the ring gear 352 is a separate ring which is shrunk onto the ring 68.

The matrix drive shaft 66 locates and drives the matrix through two sleeves 353 mounted on the shaft and rotating therewith. Each sleeve has at one end thereof a flanged roller portion 356 cooperating with the track 68 and a pinion 357 cooperating with the ring gear 352. The sleeves 353 are a sliding fit onto the shaft; the means by which they are retained on and driven by the shaft will be described later.

The matrix support shaft 67 is similarly mounted to the shaft 66 in the rear frame 63, but is not provided with a driving gear or with pinions such as 357. A single sleeve 360 is mounted on each end of shaft 67. Sleeve 360 has an inner roller 361 (FIG. 5) which is flanged and an outer unflanged roller 362. The flange is omitted from this roller to facilitate installation of the matrix. The flange is provided after installation of the matrix by a ring 363 which engages the outer end of roller 362 and is retained by a contracting snap ring 364 lodged in a groove in the sleeve 360. The matrix is biased rearwardly against the rollers on shafts 66 and 67 which thus provide a location for the matrix as well as a drive to it. This rearward bias is provided principally by the gas pressures acting on the matrix when the engine is in operation.

The matrix is also biased rearwardly by springs 84 (FIGURES 1 and 6) which hold the matrix against the rollers at the rear when the engine is out of operation. Springs 84 are mounted between the rear flange of the front cover 26 and carriages 366 and 367 which mount rollers 82 and 83 which engage the track surface of the matrix. There are eight springs 84, two of them bearing against each carriage 366 or 367. These springs bear against ears on the carriages and are retained by plugs which mount a seal block retainer 513 which is an arcuate plate overlying the supporting 506 when the seal is assembled. Retainer 513 is held by nuts 514. The outer surface of the support 506 is cut away to a surface 516 radially outward of the bosses 511. Seal blocks 517 are slidably mounted in the space between surface 516 and the retainer 513. Each block has an arcuate outer surface 518 configured to fit the inner perimeter of the matrix rim. The radially inner portion of block 517 projects with a loose fit into the space between adjacent bosses 511 and the ends of the blocks extend over the bosses into approximate engagement at 519. There is sufficient clearance between the surface 516 and the retainer 513 that the seal blocks may readily slide in and out to accommodate their outer surfaces 518 to the matrix rim. The seal blocks are biased outwardly by resilient means comprising two opposed curved single leaf springs 521 and 522 which lie within the support and the ends of which are accommodated by pockets 523 which are milled out slightly below the plane of the surface 516.

It will be apparent that this seal structure readily accommodates itself to the slight thermal expansion of the matrix with respect to the engine case, and also to any slight warping of the matrix. The outward pressure drop across the matrix biases the seal blocks 517 laterally against the surface 516 of the support. An advantage of the structure lies in the very small space necessary between the outer wall 48 and the matrix 33, since the seal is mounted within the inner perimeter of the matrix. The seal structure also provides a convenient and solid mounting for the exhaust collector and is easy to install. The biasing springs, the seal blocks and the retainer are installed after the matrix is in place.

It will be noted that the end 526 of the seal block immediately to the rear of the primary seal 370 and the end 527 of the seal block immediately ahead of this seal differ in dimensions from the other seal blocks because of the need to vary these lengths to accommodate to the position of the primary seal.

The front inner rim seal 501 is of the same construction as the rear seal 502 just described except that the support 525 and retainer 528 are of shorter arcuate extent. Since the pressure difference here is from the outside to the inside of the matrix, the pressure will bias the seal blocks 517 laterally against the retainer 528.

*The Outer Rim Seals*

The outer rim seals which are illustrated in FIGURES 7 to 10 serve the same function, preventing bypass of the regenerator matrix, as the inner rim seals. They are, however, of different structure. They engage the outer radial face of the matrix rim rather than its inner perimeter. One reason for this lies in the fact that the outer rim seals are mounted on the outer covers of the engine and are not accessible when the covers are put in place. They may more readily, therefore, be made to engage the radial face of the matrix rim. As in the case of the inner rim seals, there are forward outer rim seals ahead of the bulkhead and primary seal 370 and rear outer rim seals behind the primary seal.

The front and rear outer rim seals are alike in structure. There is one significant difference. Gas flow through the forward part of the matrix is from the outer surface to the inner surface and through the rear part of the matrix is from the inner surface to the outer surface. The pressure differential across the matrix is in the same direction in each case as the gas flow. The front seal, therefore, is made up of a number of seal blocks lying on the radially outer surface of a support so as to be biased toward it by the gas pressure differential. The rear seal is composed of a number of seal blocks lying on the inside of a support so as to be biased outwardly toward it by the gas pressure differential.

Figures 7, 8, 9, 10:
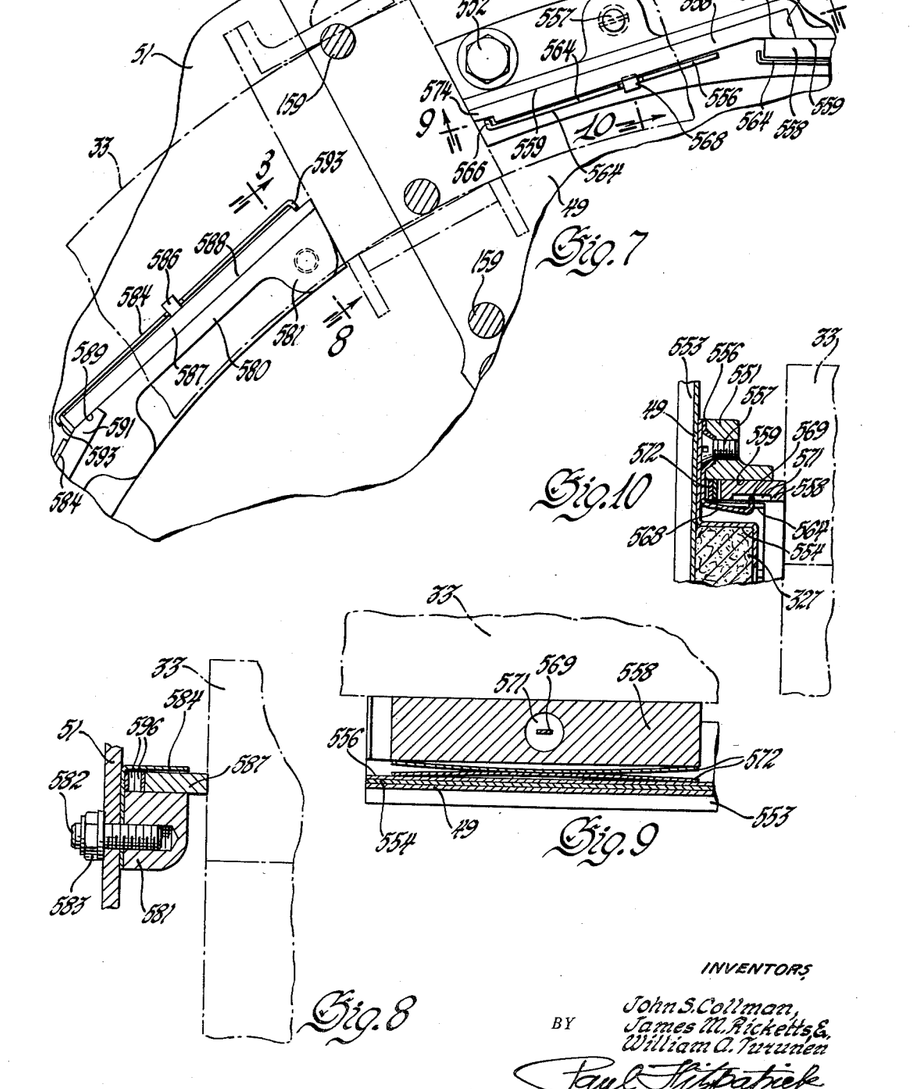
FIG. 7 is an enlarged sectional view taken on the plane indicated by the line 7—7 in FIG. 2, illustrating the outer rim seals for the regenerator.
FIG. 8 is a transverse section of the front outer rim seal taken on the plane indicated by the line 8—8 in FIG. 7.
FIG. 9 is a sectional view of the rear outer rim seal taken on the plane indicated by the line 9—9 in FIG. 7.
FIG. 10 is a transverse sectional view of the rear outer rim seal taken on the plane indicated by the line 10—10 in FIG. 7.

Refer to FIGURE 7, which shows the upper rear end of a front outer rim seal and the upper front end of a rear outer rim seal and to FIGURES 8, 9, and 10, which are cross-sectional views of these seals. The rear outer rim seal comprises an arcuate support 551 extending alongside the outer rim of the matrix from the upper to the lower primary seal and fixed by a ring of bolts 552 to the rear cover plate 49, which has a peripheral stiffening flange 553. A sheet metal retainer 554 for the insulating blanket 327 on the rear cover plate is retained between ring 551 and the cover plate by the bolts 552. A sheet metal retainer 556 is fixed to the rear face of ring 551 by flat head screws 557 received in countersinks in the retainer and in the outer surface of the support ring 551. The seal against the outer radial surface of the matrix rim is provided by a ring of overlapping seal blocks 558 lying against flat faces 559 on the inner surface of the support. One end of each seal block abuts a generally radial abutment 561 joining adjacent faces of the support. The end of the seal block 558 which engages the abutment 561 is chamfered outwardly as indicated at 563 so as to lie in the plane of the next face 559 and against the outer surface of the next seal block 558. The seal blocks are urged against the abutments 561 by the rotation of the matrix, which is clockwise as viewed in FIGURE 7.

The retainer 556 serves to hold the seal blocks against falling out of place before the engine is assembled and when it is out of operation. The retainer includes a number of portions 564 bent outwardly at 90° from the plane of the base of the support which overlie the face of the seal block opposite to the support. The portions 564 overlie the blocks somewhat loosely. The tip 566 of a portion 564 of the retainer is bent outwardly to lie adjacent the end of the seal block and restrain it against movement to the left as viewed in FIGURE 7. The portion 564 of the retainer overlying the seal block is in two sections, and between them there is a spring finger 568 extending from the base portion 566 of the retainer. The extreme end of the finger 568 is recurved as indicated at 569 to provide a tip which lies loosely with ample clearance in a pocket 571 in the adjacent face of the seal block. This spring finger holds the seal block against falling out of the support when the cover plate is removed from the engine. The seal block may be inserted by springing the finger out slightly and sliding the block into place.

Each seal block is biased toward the matrix rim by two opposed curved single leaf springs 572 which lie between the retainer and the seal block. Since gas pressure can get behind the seal, it also urges the seal block into engagement with the matrix. The pressure differential from the inside to the outside of the matrix biases each seal block against the support face 559. The seal block 558 immediately adjacent the primary seal 370 has an extension 574 beyond the retaining tab portion 566.

Since the front outer rim seal is much like the rear seal, it will be described briefly. It comprises an arcuate support 580 having bosses 581 secured to the front cover 51 by studs 582 and nuts 583 or by cap screws. The retainer 584 is essentially the same as that previously described, including a spring finger 586 engaging in a cavity in the seal block 587 to keep it from falling out of place. Seal blocks 587 engage flat faces 588 on the outer surface of the support and, except for the end blocks engage generally radial abutments 589. The seal blocks overlap and are chamfered inwardly as indicated at 591 at one end to secure a close fit between the overlapping portions and minimize leakage. Retainer 584 for the end seal block has two bent down portions 593, since there is no abutment on the support for the end seal block 587 to engage. When the main seal is in place, the end of this seal block engages the primary seal. Springs 596 bias the seal blocks 587 against the matrix, and the radially inward pressure differential biases the seal blocks against the abutting faces of the support.

Operation

No doubt, the operation of the engine will be apparent to those skilled in the art, but a brief statement of the operation may be desirable. The first turbine drives the compressor which delivers compressed air through the regenerator to the combustion space between the regenerator and the bulkhead. Fuel is burned in the compressed air within the flame tubes and the resulting combustion products flow through the two turbines in series. The first turbine, combustion chamber, and compressor may be termed a gas generator turbine which supplies motive fluid under pressure to the second or power turbine. The power turbine provides the useful work output of the engine. The gas exhausted from the power turbine flows outwardly through the regenerator into the exhaust collector and the exhaust pipes.

The hot exhaust gases flowing through the portion of the regenerator back of the bulkhead heat the matrices, which are rotated slowly by the compressor turbine. The matrices give up heat to the air flowing from the compressor to the combustion apparatus. The engine is started by cranking the compressor and first turbine by the starter motor, injecting fuel, and energizing the igniter. It is stopped by cutting off the fuel.

Conclusion

It will be apparent to those skilled in the art from the foregoing description of the preferred embodiment of the invention that it provides an engine of highly desirable characteristics for automotive and similar applications. The engine is economical of fuel because of the rotary regenerators and is of exceptionally light weight for a regenerative engine, particularly because of the improved structural framing of the engine.

Efficiency of the engine is benefitted by the improved regenerator seals. It may be noted that both the outer and inner rim seals are so constituted that the pressure drop across the matrix biases the seal blocks against the matrix, assisting the biasing springs. It also biases the seal block laterally against a support. Both effects tend to minimize leakage. The outer rim seals provide overlapping seal blocks without the usual gaps which provide leakage paths in overlapping seal structures.

Certain subject matter disclosed but not claimed in this application is the subject of divisional applications filed September 29, 1960, Serial No. 59,222 for Gas Turbine Regenerator Drive, and Serial No. 59,223 for Rotary Regenerator Seals.

The invention is not to be considered to be limited by the detailed description of the preferred embodiment thereof for the purpose of explaining the principles of the invention. Many modifications may be made by the exercise of skill in the art within the scope of the invention.

We claim:

A gas turbine engine comprising, in combination, a forward frame including a first shaft support, a shaft journaled in the first shaft support, a compressor rotor and a first turbine rotor mounted on the shaft, a bulkhead including a first turbine inlet cylinder fixed to the forward frame, a first turbine case, a yieldable connection between the inlet cylinder and the first turbine case, a turbine nozzle inner support mounted on the first shaft support, a first turbine nozzle mounted between the first turbine case and the nozzle inner support, two rigid rails extending from the bulkhead generally parallel to the shaft and on opposite sides thereof, a rear frame extending between and fixed to the rails and including a second shaft support, the rails constituting the structural connection of the forward and rear frames, a second turbine rotor coaxial with the first turbine rotor journalled in the second shaft support, a second turbine case enclosing the second turbine rotor mounted on the second shaft support, a second turbine nozzle mounted in the second turbine case between the turbine rotors, a yieldable connection between the first and second turbine cases, two rotary regenerator matrices mounted on opposite sides of the shaft and passing through the bulkhead, and means on the rear frame and forward frame supporting the matrices.

References Cited in the file of this patent

UNITED STATES PATENTS

| | | |
|---|---|---|
| 1,503,919 | Schmidt | Aug. 5, 1924 |
| 1,591,794 | Stevens | July 6, 1926 |
| 1,754,426 | Hodgkinson | Apr. 15, 1930 |
| 2,459,079 | Johnson | Jan. 11, 1949 |
| 2,620,624 | Wislicenus | Dec. 9, 1952 |
| 2,747,843 | Cox et al. | May 29, 1956 |
| 2,800,767 | Taylor | July 30, 1957 |
| 2,839,894 | Shutts et al. | June 24, 1958 |
| 2,858,110 | Blaskowski | Oct. 28, 1958 |
| 2,875,579 | Gerdau et al. | Mar. 3, 1959 |

FOREIGN PATENTS

| | | |
|---|---|---|
| 276,241 | Switzerland | Oct. 1, 1951 |

OTHER REFERENCES

"Firebird II's Engine," by Turunen et al., SAE Journal, vol. 64, No. 8, July 1956, pages 48 and 52–55.